D. L. NEWTON.
POWER HITCH FOR PUMP CABLES.
APPLICATION FILED APR. 6, 1922.
1,433,090.
Patented Oct. 24, 1922.
2 SHEETS—SHEET 1.
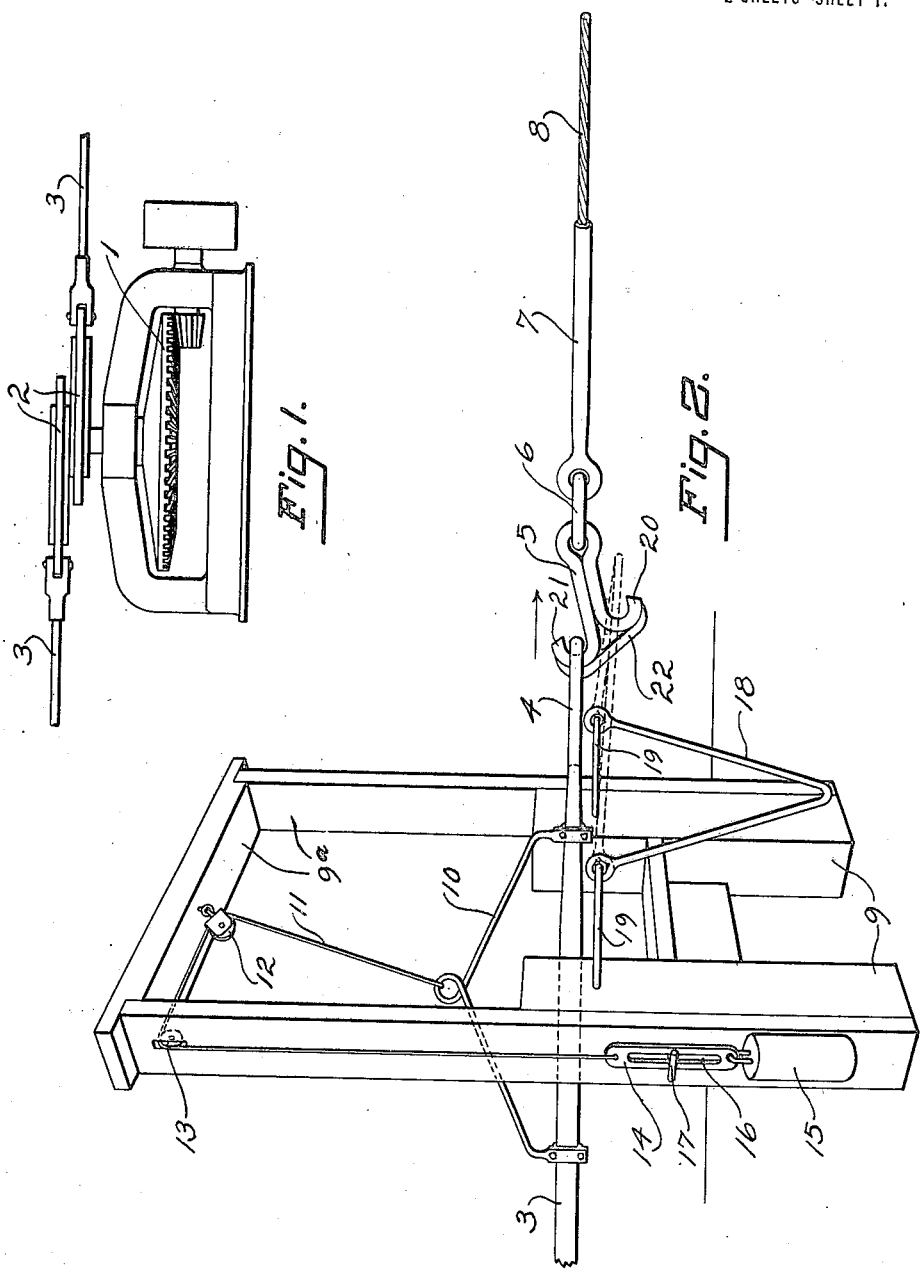
Inventor
DANIEL L. NEWTON
Lyon & Lyon
Attorneys

D. L. NEWTON.
POWER HITCH FOR PUMP CABLES.
APPLICATION FILED APR. 6, 1922.

1,433,090.

Patented Oct. 24, 1922.
2 SHEETS—SHEET 2.

Inventor
DANIEL L. NEWTON
Lyon & Lyon
Attorneys

Patented Oct. 24, 1922.

1,433,090

UNITED STATES PATENT OFFICE.

DANIEL L. NEWTON, OF FULLERTON, CALIFORNIA, ASSIGNOR TO UNION TOOL COMPANY, OF TORRANCE, CALIFORNIA, A CORPORATION OF CALIFORNIA.

POWER HITCH FOR PUMP CABLES.

Application filed April 6, 1922. Serial No. 550,025.

*To all whom it may concern:*

Be it known that I, DANIEL L. NEWTON, a citizen of the United States, residing at Fullerton, in the county of Orange and State of California, have invented a new and useful Power Hitch for Pump Cables, of which the following is a specification.

This invention relates to a power hitch for pump cables, and is particularly directed to a device operating in connection with the power rods of a pumping power unit.

The object of the invention is to provide a device by which it is possible to automatically connect or disconnect a well from the pumping power unit during a continued operation of said power unit and without effecting the operation of other wells which may be connected with the same power unit.

Various other objects and advantages will be more fully apparent from the following description of the accompanying drawings which form a part of this disclosure, and which illustrate a preferred form of embodiment of the invention.

Of the drawings:

Figure 1 is an elevation of a power unit.

Fig. 2 is a perspective view of the power hitch of the present invention, the rod and cable being connected for a pumping operation.

Figure 3:
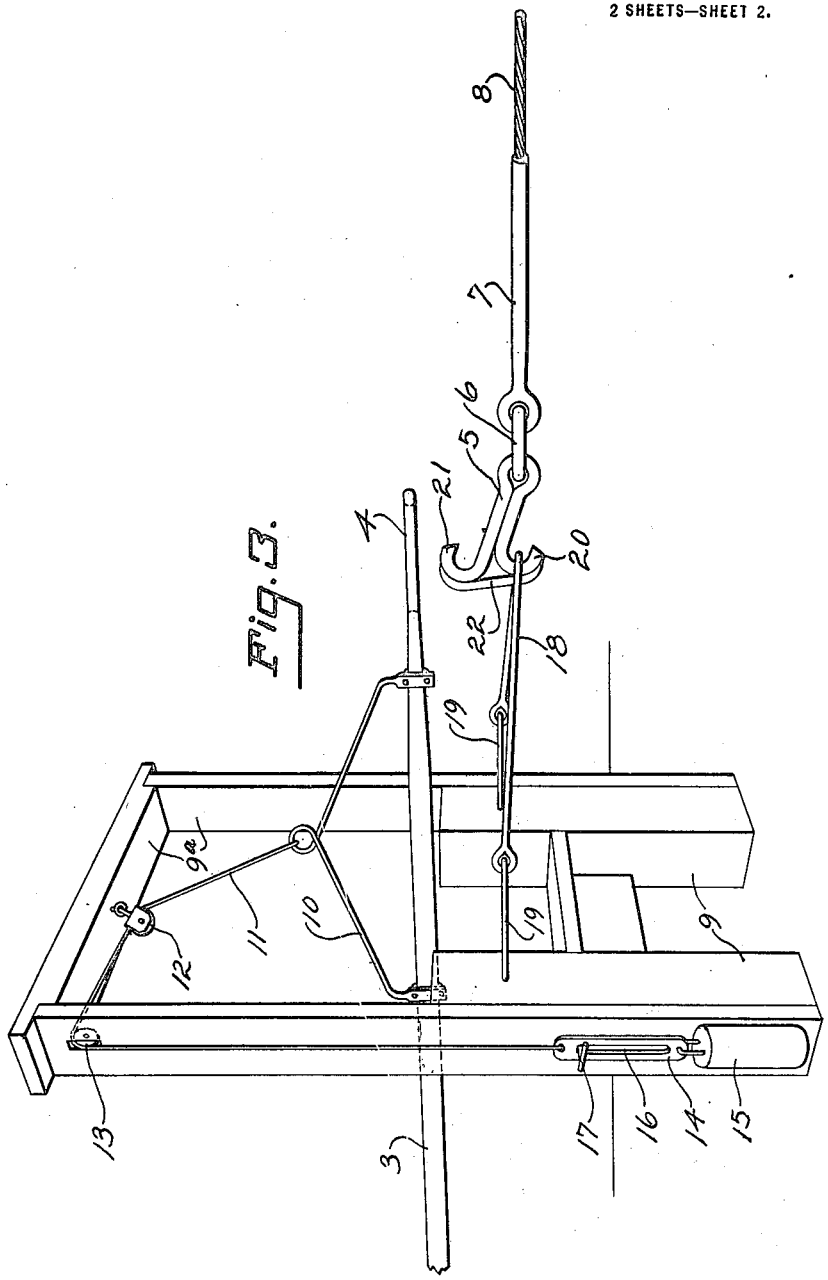
Fig. 3 is a similar perspective showing the power hitch disconnected.

The device of the present invention has particular utility with pumping equipment where several wells are pumped by means of a centralized power unit operating a power rod connected to the pull cable of each well. In such an arrangement it is frequently necessary to disconnect one or more wells from such central power unit while the others are kept pumping.

In the drawings, 1 designates a power unit having eccentric means 2 which reciprocate the power rods 3. A power line provided with my improved hitch, has an elongated eye 4 formed on the free end of the power rod 3 which is adapted to be connected to or disconnected from a throw-off hook or connecting element 5. The hook 5 is connected by a link 6 with the cable socket 7 on the free end of the pull cable 8 which leads to the well pumping jack or other pump operating mechanism of any standard or well known type. The connection of the pull cable to such pump operating mechanisms is now so well known as to require no specific illustration or description herein.

Further in so far as the present invention is concerned the term cable as herein used is intended to include either cables or rods or their equivalents, as it is obvious that the device herein has no relation with the particular material constituting the pull line.

A stationary support comprising two posts 9 and an overhead structure 9ª, is positioned near the free end of the power rod 3 and clamped to the rod is a clevis or bail 10 to which one end of an elevator cable 11 is secured. The cable 11 extends around cable sheaves 12—13 carried by the overhead structure 10 and has secured to its opposite end a stop plate 14 to which is attached a weight 15. The stop plate 14 has an elongated slot 16 engaging over a stop pin 17, this arrangement forming a means for limiting the upward and downward movements of the free end of the power rod 3 so as to prevent a binding of the rod at its point of connection with the power unit 1. A bail 18 is horizontally pivoted on studs 19 carried by the opposed posts 9 and is positioned so that when swung upwardly its apex portion will be in position to be engaged by the lower hooked end 20 of the throw-off hook 5.

With the mechanism connected as shown in Fig. 2 the pull line is in condition for pumping the well, the weight 15 exerting a transverse or upward pressure on the free end of the power rod 3 and the cable 11 permitting a reciprocation of the rod. However, the pull of the line is so great that this transverse pressure will at this time have no effect on the power rod.

When it is desired to disconnect the pull cable without stopping the power rod, the operator swings the bail 18 upwardly to the postion shown in dotted lines in Fig. 2, as the power rod starts a return stroke. Sometime prior to the end of such return stroke the hooked end 20 of the throw-off hook 5 will engage the bail and be arrested thereby, and as the power rod 3 continues its stroke in such return direction (as indicated by the arrow in Fig. 2) it will disengage itself from the upper hooked end 21 of the throw-off hook 5 and with such disengagement the weight 15 will immediately become effective to elevate the free end of the rod to the position illustrated in Fig. 3 and out of re-engaging alignment with the hook. In such event the weight will yieldingly maintain the rod in such position during continued reciprocation and the bail will assume the pull of the pull cable.

To again connect the power rod 3 to the pull cable, its free end is depressed during the pull stroke to bring its elongated eye 4 over the upper hooked end 21 and upon the continuation of the pull stroke the power rod will again assume the load of the pull cable and draw the lower hooked end 20 of the throw-off hook 5 free from the bail 18, whereupon said bail will drop to its normal idle position.

To strengthen the throw-off hook I provide a bridge member 22 which is preferably welded to the hooked ends 20—21.

Various modifications coming within the language of the following claims are included in the scope of this invention.

I claim:

1. In a device of the nature disclosed, a reciprocating power rod, a pull cable, a connecting element detachably connecting the rod and cable, a stationary support, means carried by the support and movable to position to engage said connecting element and interrupt a return stroke of the cable to permit a disconnecting of the power rod, and means for moving the rod out of reengaging alignment with the connecting element when disconnected therefrom and for maintaining the rod in such position during continued reciprocation.

2. In a device of the nature disclosed, a reciprocating power rod, a pull cable, a connecting element detachably connecting the free ends of the rod and cable, means movable to interrupt a return stroke of said element for permitting a disconnecting of the rod therefrom, and means for maintaining the free end of the rod out of reengaging alignment with said element during continued reciprocation.

3. In a device of the nature disclosed, a reciprocating power rod, a pull cable, a connecting element detachably connecting the free ends of the rod and cable, means movable to interrupt a return stroke of said element for permitting a disconnecting of the rod therefrom, and means automatically functioning upon such disconnection to move and maintain the free end of the rod out of reengaging alignment with said element during continued reciprocation.

4. In a device of the nature disclosed, a reciprocating power rod, a pull cable, a connecting element detachably connecting the free ends of the rod and cable, means movable to interrupt a return stroke of said element for permitting a disconnecting of the rod therefrom, and means for automatically moving the free end of the rod out of reengaging alignment with the connecting element when disconnected therefrom and for yieldingly maintaining the rod in such position during continued reciprocation.

5. In a device of the nature disclosed, a reciprocating power rod, a pull cable, a connecting element detachably connecting the free ends of the rod and cable, means movable to interrupt a return stroke of said element for permitting a disconnecting of the rod therefrom, and means maintaining a transverse pressure on the rod whereby upon a continuation of the return stroke of the rod it will be moved out of reengaging alignment with the connecting element and yieldingly held in such position during continued reciprocation of the rod.

6. In a device of the nature disclosed, a reciprocating power rod, a pull cable, a connecting element detachably connecting the free ends of the rod and cable, means movable to interrupt a return stroke of said element for permitting a disconnecting of the rod therefrom, and an automatic elevator means engaging the rod and exerting a transverse lifting pressure on the rod whereby upon a continuation of the return stroke the free end of the rod will be automatically lifted out of reengaging alignment with the connecting element when disengaged therefrom and yieldingly maintained in such position during continued reciprocation.

7. In a device of the nature disclosed, a reciprocating power rod, a pull cable, a throw-off hook detachably connecting the free ends of the rod and cable, a stationary support, a stop member carried by the support and manually movable to engage the hook to interrupt a return stroke thereof and assume the pull of the cable, and automatic means for subsequently lifting the free end of the rod when relieved of the cable pull and for maintaining the rod out of reengaging alignment with the hook during continued reciprocation.

Signed at Los Angeles, California, this 31st day of March, 1922.

DANIEL L. NEWTON.

Witnesses:
LEONARD S. LYON.
L. BELLE WEAVER.